Figure 1:
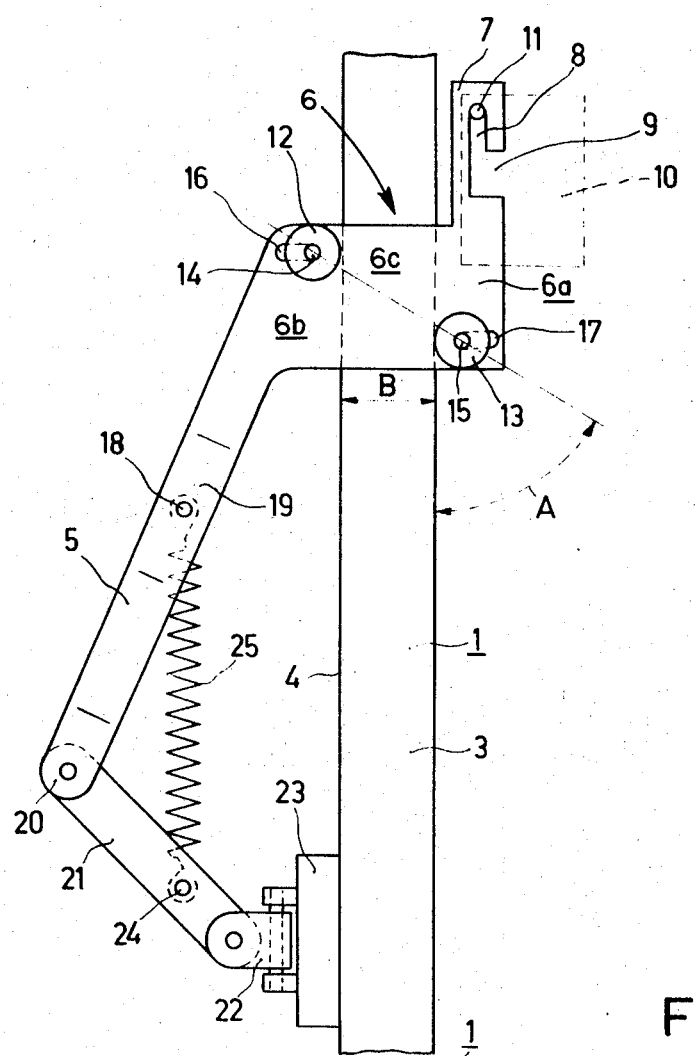

United States Patent [19]
Willems

[11] 3,862,392
[45] Jan. 21, 1975

[54] DEVICE FOR AN APPARATUS FOR THE AUTOMATIC ELECTRIC ARC WELDING APPARATUS

[75] Inventor: Gerardus Antonius Maria Willems, Emmasingel, Eindhoven, Netherlands

[73] Assignee: U.S. Philips Corporation, New York, N.Y.

[22] Filed: May 7, 1973

[21] Appl. No.: 357,648

Related U.S. Application Data

[63] Continuation of Ser. No. 194,964, Nov. 2, 1971, abandoned.

[52] U.S. Cl. .................................. 219/73, 219/126
[51] Int. Cl. ............................................. B23k 9/18
[58] Field of Search...... 219/73, 126, 107, 101–102, 219/104

[56] References Cited
UNITED STATES PATENTS
3,419,700  12/1968  Tanigako et al. .................... 219/126
3,436,519  4/1969  Weisselberg et al. ............... 219/126

FOREIGN PATENTS OR APPLICATIONS
1,039,897  8/1966  Great Britain ...................... 219/126

*Primary Examiner*—C. L. Albritton
*Attorney, Agent, or Firm*—Frank R. Trifari

[57] ABSTRACT

Welding apparatus including blocks for enclosing the molten material in a vertical welded seam, the blocks being vertically movable by a drive mechanism, and being restrained in a fixed location when disengaged from the drive mechanism.

5 Claims, 2 Drawing Figures

Patented Jan. 21, 1975   3,862,392

INVENTOR.
GERARDUS A.M. WILLEMS
BY
AGENT

DEVICE FOR AN APPARATUS FOR THE AUTOMATIC ELECTRIC ARC WELDING APPARATUS

This is a continuation of application Ser. No. 194,964, filed Nov. 2, 1971 and now abandoned.

The invention relates to a device for an apparatus for the automatic electric welding together, of the end faces of two metal bodies, for example, sheets, in which an approximately vertically extending seam to be filled with molten metal is present between the end faces and the flowing away of the molten metal out of the seam is prevented by blocks which are situated on either side of the seam and are preferably cooled and also preferably consist of metal. The apparatus supplying the welding material moving on one side of the seam from the bottom to the top thereof, with the block situated on the same side of the seam as the apparatus being rigidly or resiliently secured to the apparatus.

The welding which is carried out in the above-described manner is known in practice by the name of "enclosed welding" and this may be both electrogas welding and electroslag welding. Although the blocks which are to prevent the flowing away of the molten metal out of the seam until solidification of said metal occurs may be manufactured from different metals or, for example, even from carbon, copper blocks are preferably used. On the side of the apparatus a copper block moving upwards with the apparatus is always used; on the other side this may be a stationary strip or also a moving copper block. The strip has the drawback that it has to be rather long which is expensive. Moreover, is cannot be determined during welding whether the burning-in is good and the appearance of the weld is less beautiful.

Two blocks might be used which are interconnected by means of springs. These springs must be rather strong so that they can influence the position of the apparatus. Since the apparatus determines the position of the welding material to be supplied, this position in this case is indefinite. Finally, said springs can be decoupled with difficulty only and upon decoupling the block on the side remote from the side of the apparatus must be supported or removed.

The invention obviates all these drawbacks and is characterized in that the block present on the other side of the seam is incorporated in a holder which can be connected to a vertically moving part of the apparatus so as to be easily detachable, the holder comprising means which, independent of the coupling with the apparatus, urge the block against the ends of the two bodies to be welded together and against the seam in a resilient manner and with such a pressure that the position of the block and the holder remains the same when the coupling is interrupted.

According to an embodiment of the invention the holder preferably comprises a projection which projects entirely through the seam, which projection can be coupled to the vertically moving part of the apparatus. As a result of this, a simple coupling is possible which moreover can easily be interrupted.

According to a further embodiment of the invention the projection comprises on the side of the apparatus an approximately vertically extending slot which is closed at its upper side and is open on its lower side, the vertically movable part of the apparatus comprising a pin which can be inserted into the slot. Although clamps and similar means may be used, the embodiment described can easily be manufactured and is moreover cheap.

Holding the block against the seam, also when the coupling of the apparatus is interrupted, can be effected in various manners. In the case of steel sheets, for example, the means may consist of magnets; alternatively, hooks which project through the seam may be used. Preferably, however, according to an embodiment of the invention which is destined for welding sheets, the holder comprises a rod which supports the projection on one side, the projection comprising two rotatable wheels on either side, the horizontally measured distance between the rims of each pair of wheels situated on one side being at least equal to or slightly larger than the thickness of the sheets to be welded, the line joining the centres of said wheels making an acute angle, on the side of the apparatus and the lower side of the projection, with the parts of the sheets against which the block is situated, a second rod being connected to the other end of the rod so as to be rotatable and supporting the block at its end, which is rotatable relative to the surface of the sheets to be joined, one or more tension springs being present which interconnect said two rods.

According to another embodiment of the invention the place of the wheels on the projection is adjustable. As a result of this the holder can be used for welding sheets having different thicknesses within certain limits.

Figure 2:
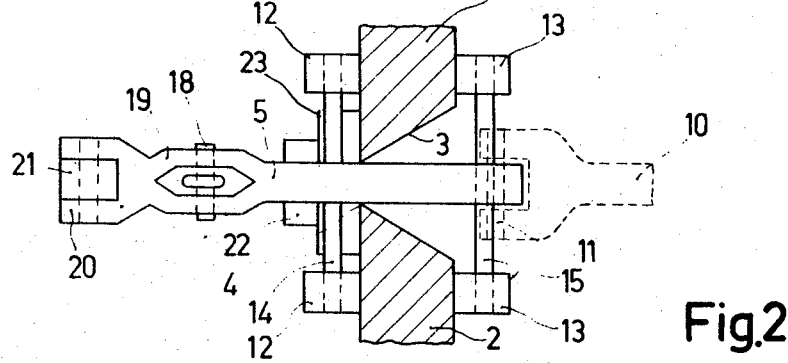

In order that the invention may be readily carried into effect, one embodiment of the invention will now be described in greater detail, by way of example, with reference to the accompanying drawing, in which FIG. 1 is a side elevation of a holder for a block with two sheets which are to be welded together and FIG. 2 is a plan view of the holder shown in FIG. 1.

In the Figures, reference numerals 1 and 2 denote two steel sheets of a ship's sheathing which are to be welded together in the vertical portion while supplying a protective gas (for example, $CO_2$). A V-welding seam 3 which is open at 4 is situated between the ends faces of the sheets. The holder for supporting the rear block 23 comprises an upper portion 6 having front part 6a, rear part 6b and intermediate part 6c; extending downward from portion 6 which is flat is a rod 5 with a lower end 20, stated differently, the upper side of a rod 5, the flat portion 6, projects through the open part 4 of the seam. On the side of the sheet where the most open part of the welding seam is situated and where the apparatus is arranged, the flat portion 6 comprises in a vertical elongation 7 a slot 8 which is closed at its top. The side of said slot 8 comprises an opening 9 so that a pin 11 which is present on a horizontal arm 10 of the apparatus, is movable vertically and is shown in broken lines can be inserted into the slot 8.

Two wheels 12 and 13 which are rotatable about shafts 14 and 15 are furthermore present on parts 6a and 6b side of the intermediate part 6c of the flat portion 6. These shafts 14 and 15 are secured in slots 16 and 17 so as to be adjustable so that the distance B between the peripheral surfaces of the two wheels is adjustable. The angle A on the front side of the apparatus is acute.

The rod 5 supports a pin 18 which is situated in a forked part 19. The end of the rod 5 forms a fork 20 in which one end of a rod 21 is rotatable. At the other end of said rod 21, a coupling means 22 is secured so as to be rotatable and to which a rear, copper block 23 is also secured so as to be rotatable, said block closing the welding seam 3 – 4. A tension spring 25 is stretched between a pin 24 on the rod 21 and the pin 18 on the rod 5.

It is obvious that the block 23 is urged against the ends of the sheets 1 and 2 to be welded together and hence against the welding seam by the spring 25.

At the same time the wheels 12 and 13 are forced on either side against the sheets, and since a small amount of play which may or may not be provided on purpose, is always present between the surfaces of the wheels and the sheets 1 and 2 (in other words: the distance B is slightly larger than the thickness of the sheets 1–2) the whole holder also clamps on the sheets.

The horizontally movable arm 10 is arranged on the apparatus is moved so that the pin 11 is inserted through the opening 9, the apparatus to be then actuated so that the arm or drive means 10 is moved vertically, until the pin 11 becomes located in the upper part of the slot 8. Upon further movement of the apparatus and the arm 10 the whole holder is taken along since the clamping of the wheels against the sheets is removed for a considerable part. The pressure of the block against the seam caused by the spring 25, however, remains, so that the seam remains closed. The closing on the other side may be effected by a vertically movable block which is secured to the apparatus in a resilient manner.

It is obvious that in the embodiment described the (expensive) copper blocks can be very small. Moreover, during welding, the burning-in and hence the weld can always be checked. The appearance of the weld upon using the holder is found to be good.

If, for example, a disturbance occurs, the apparatus can always be removed, the holder and the block remaining however, in their places, which presents great advantages, for example, in welding a ship's sheathing, inter alia also due to the large time saving. During welding, it is mainly forces in a vertical direction that are exerted on the apparatus, so that the position of the welding material which is supplied by the machine is not influenced.

Cooling of the block 23 which may be necessary can be effected by means of hoses, which are provided, for example, with instantaneous hose couplings, and are conveyed to the block through the slot 4.

Of course the coupling between the machine and the holder may also be constructed differently, for example, by a hook and eyelets.

The spring 25 may alternatively be a compression spring; in that case the wheels 13 and 14 must obtain another place so that the acute angle A becomes located on the other side of the sheets 1 and 2. The main thing is that the position of the holder, when the apparatus arm 10 is uncoupled, does not vary due to the combined effect of the spring 25 and the clamping between the wheels 13 and 14 on the sheets 1 and 2.

What is claimed is:

1. In an automatic electric welding apparatus operable with a vertically movable welding head for joining in a generally vertical welded seam the adjacent edges of two sheets, with molten metal in said seam during said welding operation and the two edges and seam having corresponding front and rear sides, the improvement in combination therewith of means for preventing a flow of the molten metal out of the seam, comprising a front block secured to the welding head and urged against the front of the seam, a rear block, a holder having the rear block secured thereto and urging said rear block resiliently against the rear of said seam, means for detachably coupling said welding head to said holder for moving said holder and rear block upward, and restraining means on the holder for maintaining the holder in a fixed position relative to said seam and the rear block in a fixed position against the seam, when said welding head is detached from the holder.

2. Apparatus according to claim 1 wherein said holder has an upper portion which in use extends through the seam from rear to front above the weld, said upper portion comprising a rear part rearward of the seam, a front part forward of the seam, an intermediate part between front and rear parts, and two rotatable wheels, each wheel having a pivot axle secured to each of the front and rear parts with allowance for slight horizontal movement of the axle relative to the part, and with the peripheral surfaces of the wheels being adjacent the front and rear sides of the edges of said sheets, the distance between said two wheels being variable and at least as great as the thickness of the sheets being welded, wherein a line between the two wheel axles extends downward relative to the front surface of said sheets and forms an acute angle therewith.

3. Apparatus according to claim 1 further comprising cooling means and means for thermally connecting the cooling means to the blocks for cooling same.

4. Apparatus according to claim 2 wherein said front part includes a generally vertical slot closed at the top and open at the bottom, said slot adapted to receive and be coupled to a part of said welding head, whereby upward movement of the welding head lifts the holder and said blocks.

5. Apparatus according to claim 2 wherein said holder further comprises a first rod part extending downward from said upper part, and having a lower end, a second rod part having one end pivotally joined to said lower end of the first rod and an opposite end pivotally joined to said rear block, and a tension spring secured between said two rods urging the second rod and rear block to pivot relative to the first rod toward said seam.

* * * * *

UNITED STATES PATENT AND TRADEMARK OFFICE
CERTIFICATE OF CORRECTION

PATENT NO. : 3862392
DATED : January 21, 1975
INVENTOR(S) : GERARDUS ANTONIUS MARIA WILLEMS It is certified that error appears in the above–identified patent and that said Letters Patent are hereby corrected as shown below:

On the Title Page

Column 1, following item [21], insert

--[30] Foreign Application Priority Data
May 6, 1969   Netherlands   6906870--

Column 1, Item [63], after "abandoned" add

--, which is a continuation of Ser. No. 31,310, April 23, 1970, abandoned--

---

Column 1, line 5, after "abandoned" insert

--, which in turn is a continuation of application Ser. No. 31,310, filed April 23, 1970 and now abandoned.--

UNITED STATES PATENT AND TRADEMARK OFFICE
CERTIFICATE OF CORRECTION

PATENT NO. : 3862392
DATED : January 21, 1975
INVENTOR(S) : GERARDUS ANTONIUS MARIA WILLEMS It is certified that error appears in the above—identified patent and that said Letters Patent are hereby corrected as shown below:

Column 2, line 39, Change "portion" to --position--

Column 3, line 17, change "is" to --to be-- line 18, change "to be" to --is--

Signed and Sealed this twenty-sixth Day of July 1977

[SEAL]

Attest:

RUTH C. MASON
Attesting Officer

C. MARSHALL DANN
Commissioner of Patents and Trademarks